United States Patent
Thomsen, III et al.

(10) Patent No.: US 7,647,771 B2
(45) Date of Patent: Jan. 19, 2010

(54) THERMALLY DRIVEN PISTON ASSEMBLY AND POSITION CONTROL THEREFOR

(75) Inventors: Donald L. Thomsen, III, Yorktown, VA (US); Robert G. Bryant, Lightfoot, VA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 249 days.

(21) Appl. No.: 11/374,480

(22) Filed: Mar. 8, 2006

(65) Prior Publication Data

US 2006/0236690 A1    Oct. 26, 2006

Related U.S. Application Data

(60) Provisional application No. 60/662,343, filed on Mar. 9, 2005.

(51) Int. Cl.
*F01B 29/10* (2006.01)
(52) U.S. Cl. .......................................... 60/527; 60/528
(58) Field of Classification Search .......... 605/527–529
See application file for complete search history.

(56) References Cited

U.S. PATENT DOCUMENTS

| 3,438,256 | A | * | 4/1969 | Schwartz | ..................... 60/527 |
| 4,843,293 | A | | 6/1989 | Futami | |
| 5,025,627 | A | * | 6/1991 | Schneider | ..................... 60/527 |
| 5,491,372 | A | | 2/1996 | Erhart | |
| 5,557,154 | A | | 9/1996 | Erhart | |
| 6,476,537 | B1 | | 11/2002 | Pease et al. | |
| 6,543,224 | B1 | * | 4/2003 | Barooah | ..................... 60/527 |
| 6,707,231 | B2 | | 3/2004 | Pease et al. | |
| 6,806,600 | B2 | | 10/2004 | Willacy et al. | |

FOREIGN PATENT DOCUMENTS

JP        2003205496 A  *  7/2003

OTHER PUBLICATIONS

S. Courty, J. Mine, A.R. Tajbakhsh, and E.M. Terentjev, "Nematic Elastomers With Aligned Carbon Nanotubes: New Electromechanical Actuators," Europhysics Letters, EDP Sciences, p. 654-660.

* cited by examiner

*Primary Examiner*—Hoang M Nguyen
(74) *Attorney, Agent, or Firm*—Robin W. Edwards

(57) ABSTRACT

A thermally driven piston assembly's housing has (i) a first material slidingly fitted therein, and (ii) at least one plug of a second material slidingly fitted therein and abutting the first material. The first material is one (e.g., a liquid crystal elastomer) that undergoes a stiffness change and/or a dimensional change when subjected to a temperature change in the temperature range of interest. When subjected to the temperature change while in the housing, the first material is restricted to changing dimensionally along a single dimension. The second material retains its shape and size throughout the temperature range of interest. As a result, the plug moves in the housing in correspondence with the dimensional change of the first material or the plug's movement is damped by the stiffness change of the first material.

39 Claims, 5 Drawing Sheets

THERMALLY DRIVEN PISTON ASSEMBLY AND POSITION CONTROL THEREFOR

Pursuant to 35 U.S.C. § 119, the benefit of priority from provisional application 60/662,343, with a filing date of Mar. 9, 2005, is claimed for this non-provisional application.

ORIGIN OF THE INVENTION

The invention described herein may be manufactured and used by or for the Government of the United States of America for governmental purposes without the payment of any royalties thereon or therefor.

BACKGROUND OF THE INVENTION

1. Field of the Invention

This invention relates to actuator or damping devices utilizing a piston. More specifically, the invention is a thermally driven piston assembly and position control system therefor with the piston being able to function as an actuator or a damping device.

2. Description of the Related Art

In the past, linear actuators required a transmission system to convert a motor's rotational energy into linear displacement. However, such linear actuators systems are not practical in many space-restricted applications. More recently, linear actuators use hydraulic or pneumatic driven pistons or have been made from stacks of piezoelectric materials that can generate a strong linear force when space is at a premium. However, hydraulically/pneumatically driven pistons require a pump to effect volumetric or pressure changes that move a piston. Piezoelectric-based linear actuators have low strain characteristics, thereby limiting their linear travel.

Currently, a variety of muscle-like polymer materials are being evaluated for use in actuator or damping devices owing to their ability to undergo large changes in strain and stiffness when activated. However, there is a need to provide simple and efficient actuator "packages" for these materials that capitalize on their large strain characteristics to achieve a linear actuator or damping response. Further, since several of these polymer materials have a tendency to exhibit creep, the actuator package that includes such polymer materials must be able to compensate for a material's creep characteristics.

SUMMARY OF THE INVENTION

Accordingly, it is an object of the present invention to provide the means to generate a linear response using a muscle-like polymer material.

Another object of the present invention is to provide the means to generate and control a linear response of a muscle-like polymer in order to compensate for the material's creep characteristics.

Still another object of the present invention is to generate a tunable damping response using a muscle-like polymer material.

Other objects and advantages of the present invention will become more obvious hereinafter in the specification and drawings.

In accordance with the present invention, a thermally driven piston assembly has a housing that remains rigid throughout a temperature range of interest. A first material is slidingly fitted in a hollow portion of the housing such that the first material is limited to movement along a single dimension of the hollow portion. The first material is one (e.g., a liquid crystal elastomer) that undergoes a stiffness change and/or a dimensional change when subjected to a temperature change in the temperature range of interest. When subjected to the temperature change while in the housing, the first material is restricted to changing dimensionally along the single dimension. At least one plug of a second material is slidingly fitted in the housing's hollow portion adjacent the first material. The second material retains its shape and size throughout the temperature range of interest. As a result, the plug moves in the housing's hollow portion along the afore-said single dimension in correspondence with the dimensional change of the first material or the plug's movement is damped by the stiffness change in the first material. A position control system can be provided if the first material has inherent creep characteristics.

DETAILED DESCRIPTION OF THE INVENTION

Figure 1:
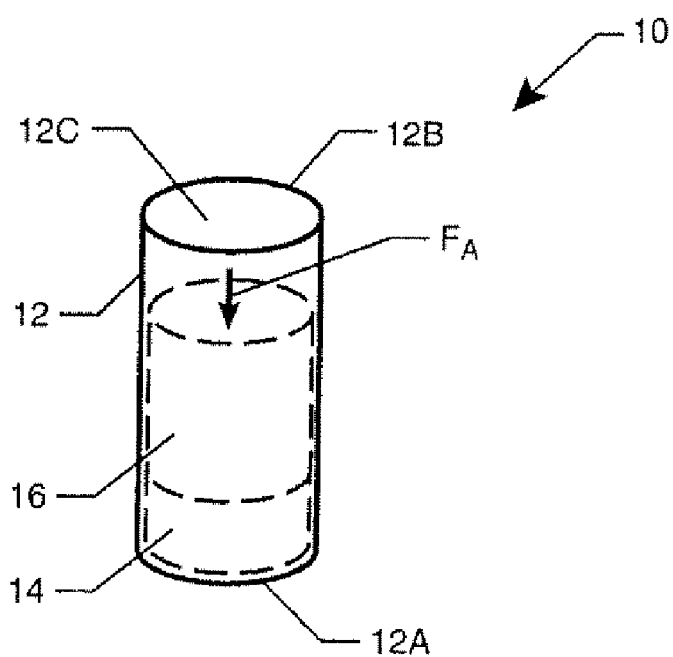
FIG. 1 is a perspective view of a thermally driven piston assembly providing linear motion or damping forces in accordance with an embodiment of the present invention.

Referring now to the drawings, and more particularly to FIG. 1, an embodiment of a thermally driven piston assembly in accordance with the present invention is shown and is referenced generally by numeral 10. Piston assembly 10 can be operated to perform an actuation, damping, or sensing function without departing from the scope of the present invention. Briefly, in an actuation or damping operation, heat is applied in a controlled fashion to generate piston movement (for actuation) or force (for damping). In a sensing operation, an environment's changing temperature causes piston movement/force with such movement/force being used as an indicator of the changing temperature. However, the operating principles of piston assembly 10 are the same for each of these functions.

Piston assembly 10 includes housing 12, a thermally-active shape changing material 14 that is shaped/sized to slidingly fit in housing 12, and a plug or "piston" 16 slidingly fit in housing 12 and made from a material that retains its shape when exposed to temperatures that are sufficient to activate the shape changing features of material 14.

Housing 12 is closed or otherwise configured at an end 12A thereof that abuts shape changing material 14 to retain material 14 at end 12A. Housing 12 can be closed or opened at opposing end 12B. Housing 12 defines a hollow portion 12C thereof that slidingly receives each of material 14 and piston 16. Hollow portion 12C is typically cylindrical but can define other two-dimensional geometries (e.g., triangular, polygon, etc.) without departing from the scope of the present invention. Housing 12 can be made of any material that will retain a rigid shape throughout a temperature range of interest, i.e., a temperature range that will activate the shape changing features of material 14. Additionally, housing 12 can be made from a thermally conductive material to transfer either an applied heat energy or environmental heat energy to material 14.

Shape changing material 14 is any material that changes dimensionally and/or in stiffness with temperature changes while retaining elasticity and viscosity. Material 14 can be any thermally-active material that possesses a restoring force or spring constant owing to the material's chemical or physical cross-linking properties. By radially restraining material 14 as is the case for a cylindrical hollow portion 12C of housing 12 (or by restraining material 14 two-dimensionally in length/width as is the case for a polygonally-shaped hollow portion 12C), any dimensional change in material 14 is restricted to the axial dimension of hollow portion 12C. That is, the dimensional change in material 14 in the presence of a temperature change amounts to a linear movement of material 14. Since material 14 is restrained from such linear movement at end 12A of housing 12, the linear movement of material 14 is restricted towards or away from end 12A.

The present invention can also operate as a damping device when material 14 experiences changes in stiffness with changes in temperature. Referring again to FIG. 1, assume material 14 is further limited in or restricted from axial movement by means of (for example) an axial force FA applied to piston 16. With material 14 being capable of experiencing changes in stiffness with changes in temperature, then piston assembly 10 can be controlled to act as an axial force damping device. In this instance, it is possible that material 14 will experience little or no dimensional changes.

Suitable choices for material 14 include a variety of viscoelastic materials satisfying the above-noted criteria. For example, polymers such as polyurethanes and liquid crystal elastomers (LCE) are good choices as these materials exhibit good viscoelastic properties in their glass transition regions and in their phase transition regions. In particular, LCEs have demonstrated muscle-like mechanical properties with large shape changes occurring through the nematic liquid crystalline phase transition. Accordingly, the various embodiments described herein will reference the use of an LCE as the thermally-active shape changing material. By way of example, one suitable LCE is made from (4"-Acryloyloxybuty) 2.5-di(4'-butyloxybenzoyloxy)benzoate and 1.6-hexanediol diacrylate in accordance with known methodologies such as those described by D. L. Thomsen, III, et al. in "Liquid Crystal Elastomers with Mechanical Properties of a Muscle," Macromolecules 2001, 34, pp. 5868-5875.

It is to be understood that the present invention is not limited to LCEs as a variety of elastomers, foams, crosslinked polymers, and composite matrix materials could also be used. Some representative elastomers include butadiene rubber, butyl rubber, chlorinated polyethylene, crosslinked polyethylene, chlorosulphonated polyethylene, epichlorohydrin-ethylene oxide, ethylene propylene diene terpolymer, ethylene-propylene rubber, EVA, natural rubber, nitrile rubber, polyacrylate, polymethylmethacrylate, polychloroprene, polyisoprene, polypropylene oxide, polyurethane, silicone, styrene butadiene rubber, and thermoplastic elastomers. Some representative foams include polymer foams that can be closed cell, microcellular, and open cell. Some representative crosslinked polymers include polystyrene, polyvinyl chloride, polyamino acids, proteins, polyethylene, polycarbonate, polyester, nylon, phenolic, polymethacrylimide, and polyethersulphone. Some representative composite matrix materials include polyimides, liquid crystal polymers such as liquid crystal polyesters and liquid crystal polyaramides, epoxies, polyamides, polyaramides, polyethers such as PEEK and PET, and polyarylethers such as bisphenol and cyanate ester.

Piston 16 can be any rigid material that retains its shape in the temperature range in which piston assembly 10 will operate to include the range of temperatures that can activate dimensional and/or stiffness changes in material 14. To take advantage of the viscoelastic properties of material 14 that provide for opposing-direction dimensional changes in material 14, piston 16 can be coupled (e.g., attached, adhered, bonded, etc.) to material 14 where piston 16 abuts thereagainst. In this way, when material 14 experiences a temperature change such that it changes dimensionally (i.e., grows or shrinks in the axial direction of housing 12), piston 16 will move in correspondence with material 14.

Figure 2:
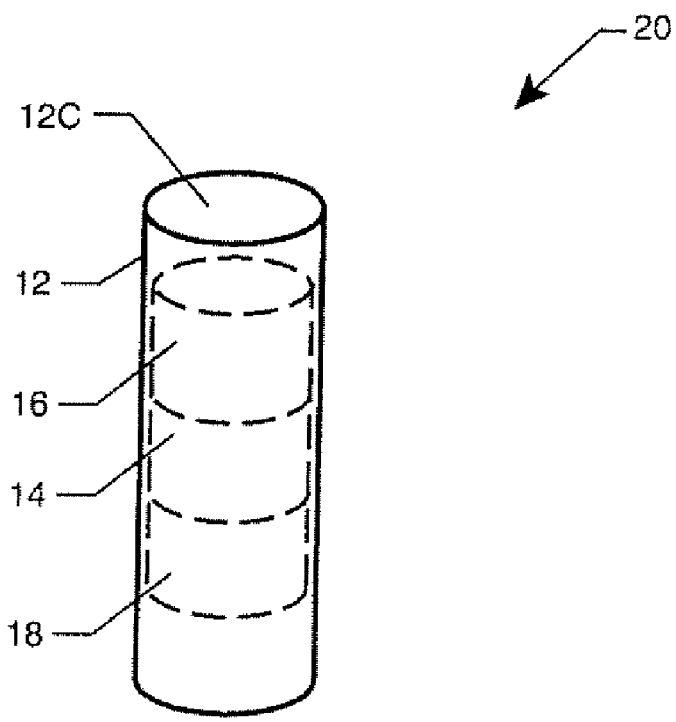
FIG. 2 is a perspective view of a thermally driven piston assembly providing linear motion simultaneously in two opposing directions in accordance with another embodiment of the present invention.

The present invention is not limited to the embodiment described above. By way of illustrative example, two other possible embodiments of the present invention will now be described with the aid of FIGS. 2 and 3. In FIG. 2, a thermally driven piston assembly 20 includes a rigid housing 12 having hollow portion 12C, shape changing material 14 slidingly fitted in hollow portion 12C, and two pistons 16 and 18 slidingly fitted in hollow portion 12C and disposed on either side of material 14. As in the previous embodiment, pistons 16 and 18 can be coupled to shape changing material 14. In this way, when material 14 experiences a temperature change such that it changes dimensionally (i.e., along the axial dimension of hollow portion 12C), the linear movement of material 14 and resultant force is imparted to pistons 16 and 18 simultaneously. As a result, pistons 16 and 18 are moved in opposing directions away from or towards one another. Piston assembly 20 could also function as a damping device in a fashion similar to that described for piston assembly 10.

Figure 3:
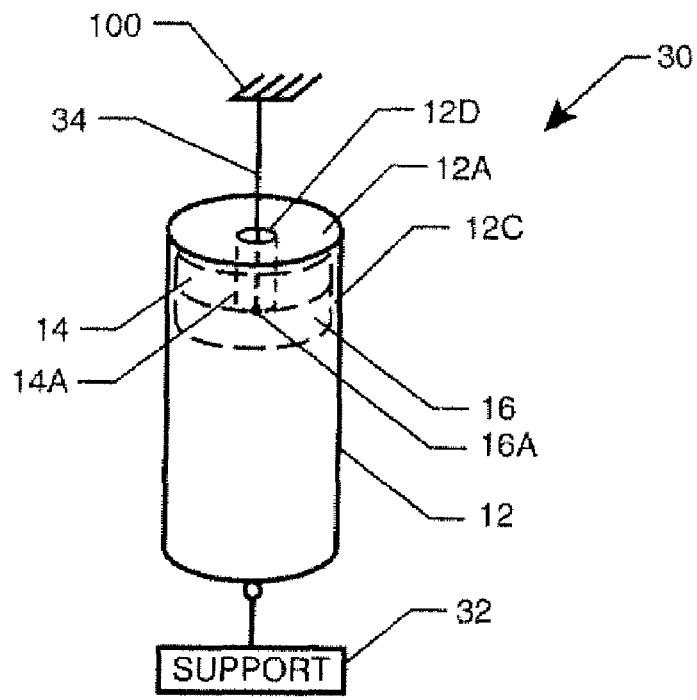
FIG. 3 is a perspective view of a thermally driven piston assembly that can generate a tension force in accordance with another embodiment of the present invention.

FIG. 3 illustrates a thermally driven piston assembly 30 that includes the following:

(i) rigid housing 12 having hollow portion 12C and having a port 12D formed in closed end 12A, (ii) shape changing material 14 slidingly fitted in hollow portion 12C and further having a hole 14A formed therethrough and aligned with port 12D when material 14 is positioned in housing 12 adjacent closed end 12A, (iii) piston 16 slidingly fitted in hollow portion 12C such that material 14 is positioned between closed end 12A and piston 16, (iv) a support 32 coupled to one end of housing 12 to prevent movement of housing 12 in its axial dimension, and (v) a tension member 34 rigidly coupled on one end thereof to piston 16 at 16A and on the other end thereof to a support 100.

In operation of piston assembly 30, temperature changes causing an axial dimensional expansion in material 14 causes a tension force to be applied along tension member 34. If material 14 is coupled to closed end 12A and piston 16, axial shrinkage of material 14 will relax the tension in tension member 34.

Figure 4:
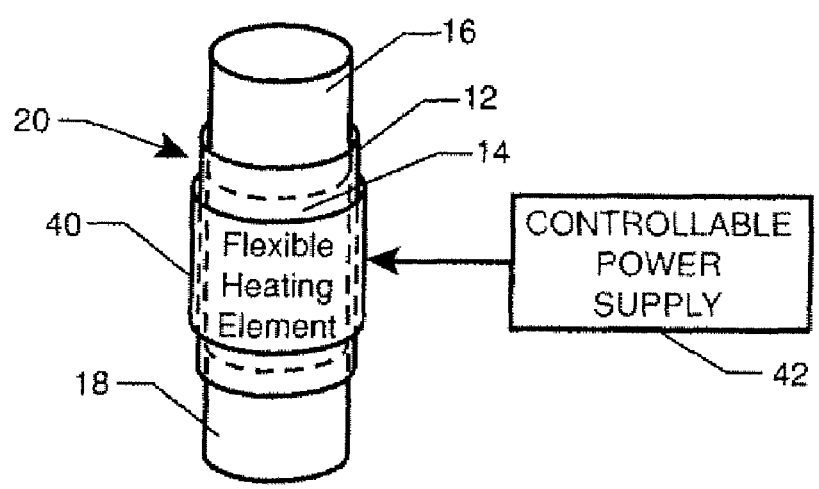
FIG. 4 is a side view of a thermally driven piston assembly of FIG. 2 further including a controllable heater for actuating the assembly's thermally-active shape changing material.

In each embodiment of the present invention, thermal activation of material 14 can occur actively or passively (e.g., via environmental temperature changes). By way of example, one way of providing for active thermal activation of material 14, is illustrated in FIG. 4. More specifically, piston assembly 20 is shown with a flexible heating element 40 wrapped about housing 12 which, for this example, would be made from a thermally conductive material. Such heating elements are well known in the art and can include, for example, nichrome wire heaters, fabric heaters, heating mantles, and MINCO® brand flexible heaters. A controllable power supply 42 coupled to heating element 40 controls the temperature changes that will ultimately be experienced by material 14.

Figure 5:
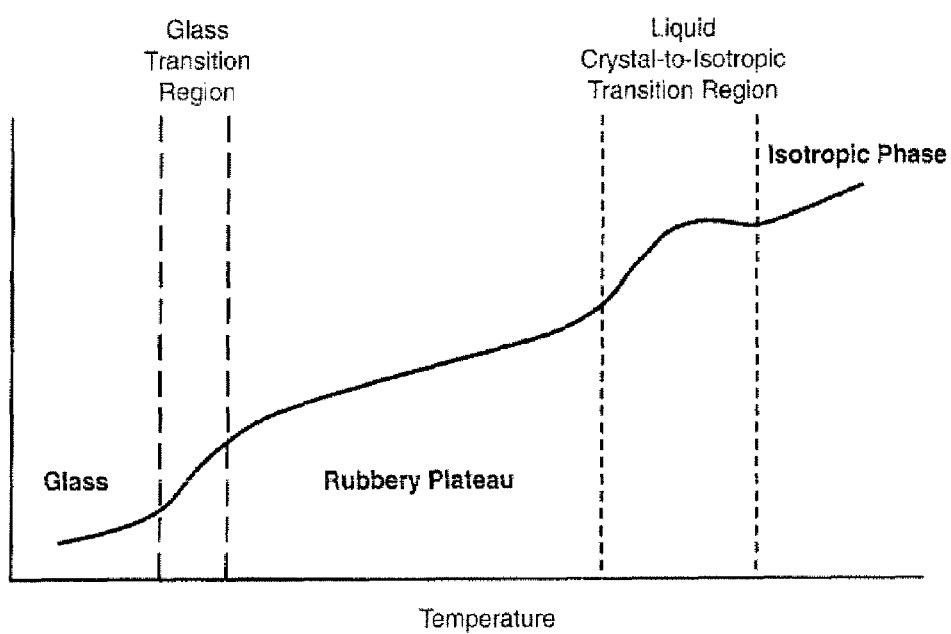
FIG. 5 is a graph of temperature versus enthalpy change for a liquid crystal elastomer.

As mentioned above, a good choice for material 14 is a liquid crystal elastomer (LCE). A graph of temperature versus enthalpy change for a typical LCE is shown in FIG. 5. Of note are the large enthalpy changes experienced in both the glass transition region and the liquid crystal-to-isotropic transition region of an LCE. That is, when the temperature of the LCE is in one of these regions, the LCE undergoes its greatest dimensional changes. In addition to providing large shape changes, LCEs provide good damping properties as a result of the liquid crystal-backbone coupling.

Figure 6:
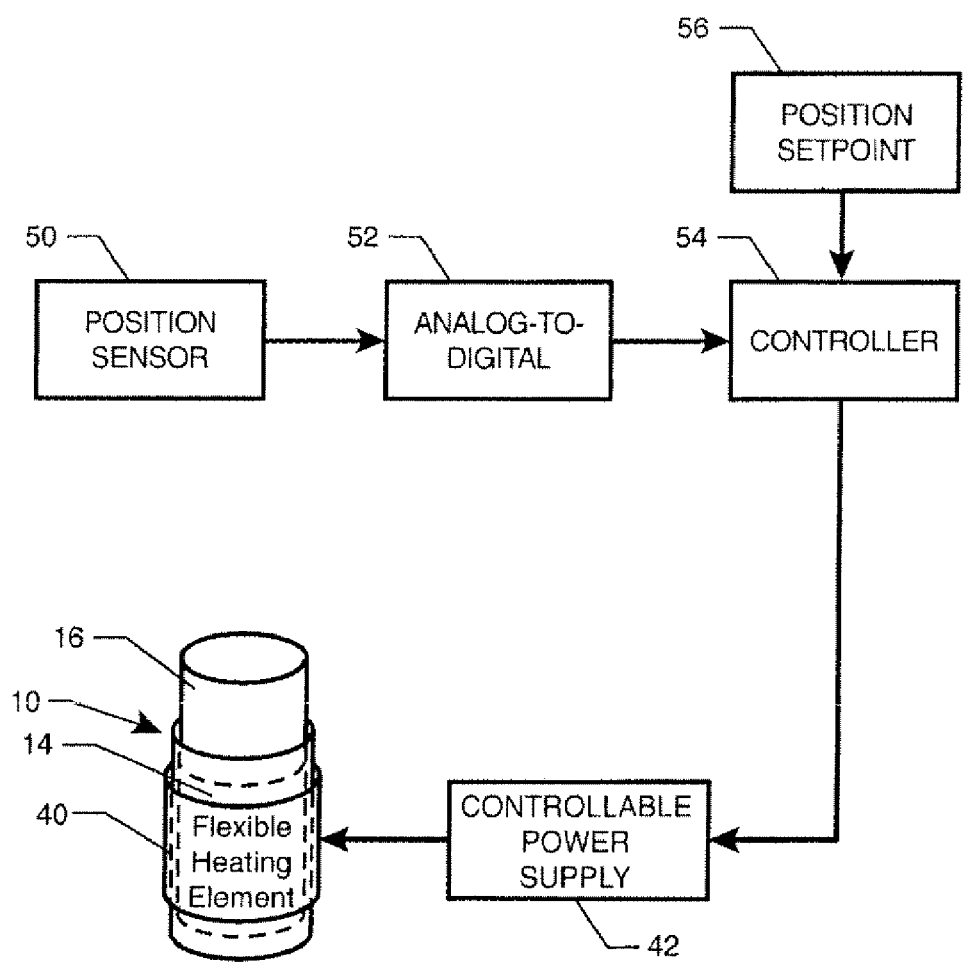
FIG. 6 is a schematic view of the thermally driven piston assembly of FIG. 1 further including a position control system coupled thereto to detect and compensate for creep inherent in the assembly's thermally-active shape changing material.

While the shape changing characteristics of LCEs make them attractive candidates for use in the present invention, LCEs also have inherent creep tendencies at isothermal conditions. Thus, there may be applications of the present invention where fixing the temperature of the LCE does not provide the necessary position control of the piston assembly being driven by an LCE-based material 14. In these applications, it may be helpful to couple a position control system to the present invention's piston assembly. For example, one such position control system is coupled to piston assembly 10 as illustrated in FIG. 6. More specifically, a position sensor 50 (e.g., a laser range finder, optical encoder, Hall effect sensor, LVDT, piezoceramic, air bearing, pneumatic, mechanical calipers, potentiometer, etc.) is positioned to sense/detect axial movement of piston 16. The output of sensor 50 is supplied to a controller 54. If necessary, the output of sensor 50 can be converted to digital at an analog-to-digital converter 52. A position setpoint 56 provided to controller 54 is compared to the sensed position of piston 16. The difference between the sensed position and position setpoint 56 is used to generate a feedback control signal supplied to controllable power supply 42 which is coupled to heater 40 as explained above. Position control of a piston assembly of the present invention can be used for both actuation and damping functions.

The present invention is not limited to the piston assembly constructions described above. The "housing" used to form a piston assembly of the present invention could be constructed in a variety of ways to include a variety of geometries where the geometry would then define the shape of the shape changing material. Further, the housing could be constructed to support actively-controlled heating and cooling elements.

Figure 7:
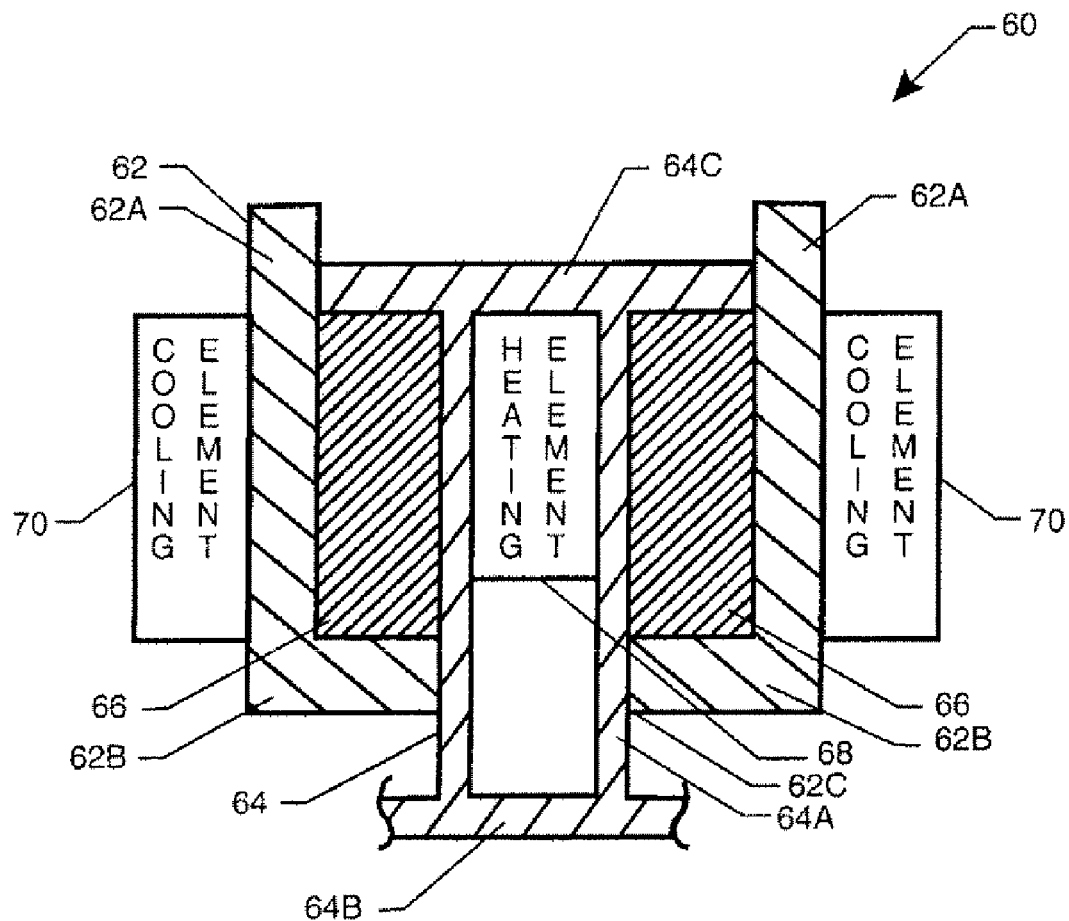
FIG. 7 is a part cross-sectional, part schematic view of another embodiment of a piston assembly in accordance with the present invention.

An example of an alternative construction is illustrated in FIG. 7 where the "housing" of a piston assembly 60 is formed by an annular region between housing portions 62 and 64. Housing portion 62 has an annular (cylindrical) side wall 62A and an integral annular end wall 62B having a hole 62C formed therethrough. Housing portion 64 has an annular (cylindrical) side wall 64A, a first end wall 64B, and a second opposing end wall 64C. Annular side wall 64A defines an outside diameter that slidingly fits through hole 62C. First end wall 64B is sized larger than hole 62C and is positioned on the exterior of housing portion 62. Second end wall 64C is sized to slidingly fit in annular side wall 62A.

Filling the annular region between annular side wall 64A and annular side wall 62A is a donut or sleeve-shaped shape changing material 66, i.e., a material possessing the characteristics of shape changing material 14. A heating element 68 can be positioned within annular side wall 64A and a cooling element 70 can be provided about (e.g., wrapped about) the outside of annular side wall 62A. Note that heating element 68 and cooling element 70 can switch positions without departing from the scope of the present invention. In operation, the heating and cooling elements are operated/controlled to control the stiffness and/or dimensional changes of material 66 to provide damping for axial forces applied to housing portion 64 or linear actuation of housing portion 64.

The advantages of the present invention are numerous. The thermally-driven piston assembly can be used as a linear actuator, positioner, damping device, or thermal sensor. The assembly is easy to manufacture and is inexpensive. When made with an LCE shape changing material, the piston assembly will exhibit both muscle-like mechanical properties and damping properties. The creep tendencies of the shape changing material can be controlled with a position control feedback system.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by By Letters Patent of the United States is:

The invention claimed is:

1. A thermally driven piston assembly, comprising:
    a housing having a hollow portion that remains rigid throughout a temperature range of interest;
    a viscoelastic material slidingly fitted in said hollow portion such that said viscoelastic material is limited to movement along a single dimension of said hollow portion, said viscoelastic material undergoing at least one of a stiffness change and a dimensional change along said single dimension when subjected to a temperature change in said temperature range of interest, said viscoelastic material possessing and retaining viscoelastic properties throughout said temperature range of interest;
    at least one a plug of a second material slidingly fitted in said hollow portion adjacent said viscoelastic material, said second material being rigid and retaining its shape and size throughout said temperature range of interest;
    first means for measuring an amount of movement of said plug along said single dimension when said viscoelastic material is experiencing isothermal conditions, wherein said amount of movement is measured relative to a setpoint; and
    second means coupled to said first means for controlling said temperature change to negate said amount of movement wherein said plug returns along said single dimension to said setpoint.

2. A thermally driven piston assembly as in claim 1 wherein said hollow portion is thermally conductive.

3. A thermally driven piston assembly as in claim 1 wherein said viscoelastic material is selected from the group consisting of foam, polymer, composite matrix and elastomer.

4. A thermally driven piston assembly as in claim 3 wherein said polymer is selected from the group consisting of liquid crystal elastomer (LCE), polyurethane and crosslinked polymer.

5. A thermally driven piston assembly as in claim 4 wherein said temperature range of interest is within one of a glass transition region of said LCE and a liquid crystal-to-isotropic transition region of said LCE.

6. A thermally driven piston assembly as in claim 1 wherein said plug of said second material is coupled to said viscoelastic material.

7. A thermally driven piston assembly as in claim 1, further comprising a second plugs with said viscoelastic material being disposed between said first and second plugs.

8. A thermally driven piston assembly as in claim 7 wherein said first and second plugs are coupled to said viscoelastic material.

9. A thermally driven piston assembly as in claim 1 further comprising:
   retention means coupled to said hollow portion for retaining said viscoelastic material and said plug within said hollow portion;
   restraining means coupled to said housing for restraining movement of said housing along said single dimension; and
   tensioning means coupled to said plug and passing through said viscoelastic material and said retention means along said single dimension.

10. A thermally driven piston assembly, comprising:
    a housing having a hollow portion that remains rigid throughout a temperature range of interest;
    a first material slidingly fitted in said hollow portion such that said first material is limited to movement along a single dimension of said hollow portion, said first material undergoing at least one of a stiffness change and a dimensional change along said single dimension when subjected to a temperature change in said temperature range of interest;
    at least one plug of a second material slidingly fitted in said hollow portion adjacent said first material, said second material retaining its shape and size throughout said temperature range of interest;
    position sensing means for measuring an amount of movement of said at least one plug along said single dimension when said first material is experiencing isothermal conditions, wherein said amount of movement is measured relative to a setpoint;
    heating means for effecting said temperature change; and
    control means coupled to said sensing means and said heating means for controlling said heating means based on said amount of movement wherein said at least one plug is moved along said single dimension to be repositioned at said setpoint.

11. A thermally driven piston assembly as in claim 10 wherein said hollow portion is thermally conductive.

12. A thermally driven piston assembly as in claim 11 wherein said heating means is thermally coupled to said hollow portion.

13. A thermally driven piston assembly as in claim 10 wherein said first material is a viscoelastic material.

14. A thermally driven piston assembly as in claim 10 wherein said first material is an elastomeric material.

15. A thermally driven piston assembly as in claim 10 wherein said first material is selected from the group consisting of foam, polymer and composite matrix.

16. A thermally driven piston assembly as in claim 10 wherein said first material is a liquid crystal elastomer (LCE).

17. A thermally driven piston assembly as in claim 16 wherein said temperature range of interest is within one of a glass transition region of said LCE and a liquid crystal-to-isotropic transition region of said LCE.

18. A thermally driven piston assembly as in claim 10 wherein said at least one plug of said second material is coupled to said first material.

19. A thermally driven piston assembly as in claim 10 wherein said at least one plug comprises first and second plugs with said first material being disposed therebetween.

20. A thermally driven piston assembly as in claim 19 wherein said first and second plugs are coupled to said first material.

21. A thermally driven piston assembly as in claim 10 wherein said at least one plug comprises a single plug, said thermally driven piston assembly further comprising:
    retention means coupled to said hollow portion for retaining said first material and said single plug within said hollow portion;
    restraining means coupled to said housing for restraining movement of said housing along said single dimension; and
    tensioning means coupled to said single plug and passing through said first material and said retention means along said single dimension.

22. A thermally driven piston assembly as in claim 3 wherein said foam is a polymer foam.

23. A thermally driven piston assembly as in claim 22 wherein said polymer foam is selected from the group consisting of closed cell, microcellular, and open cell.

24. A thermally driven piston assembly as in claim 4 wherein said crosslinked polymer is selected from the group consisting of polystyrene, polyvinyl chloride, polyamino acid, protein, polyethylene, polycarbonate, polyester, nylon, phenolic, polymethacrylimide, and polyethersulphone.

25. A thermally driven piston assembly as in claim 3 wherein said elastomer is selected from the group consisting of butadiene rubber, butyl rubber, chlorinated polyethylene, crosslinked polyethylene, chlorosulphonated polyethylene, epichlorohydrin-ethlene oxide, ethylene propylene diene terpolymer, ethylene-propylene rubber, EVA, natural rubber, nitrile rubber, polyacrylate, polymethylmethacrylate, polychloroprene, polyisoprene, polypropylene oxide, polyurethane, silicone, styrene butadiene rubber. and thermoplastic elastomer.

26. A thermally driven piston assembly as in claim 3 wherein said composite matrix is selected from the group consisting of polyimide, liquid crystal polymer, epoxy, polyamide, polyaramide, polyether, and polyarylether.

27. A thermally driven piston assembly as in claim 3 wherein said temperature range of interest is within one of a glass transition region of said polymer and a phase transition region of said polymer.

28. A thermally driven piston assembly as in claim 26 wherein said liquid crystal polymer is selected from the group consisting of liquid crystal polyester and liquid crystal polyaramide.

29. A thermally driven piston assembly as in claim 26 wherein said polyether is selected from the group consisting of PEEK and PET.

30. A thermally driven piston assembly as in claim 26 wherein said polyarylether is selected from the group consisting of such as bisphenol and cyanate ester.

31. A thermally driven piston assembly as in claim 14 wherein said elastomeric material is selected from the group consisting of butadiene rubber, butyl rubber, chlorinated polyethylene, crosslinked polyethylene, chlorosulphonated polyethylene, epichlorohydrin-ethlene oxide, ethylene propylene diene terpolymer, ethylene-propylene rubber, EVA, natural rubber, nitrile rubber, polyacrylate, polymethylmethacrylate, polychloroprene, polyisoprene, polypropylene oxide, polyurethane, silicone, styrene butadiene rubber, and thermoplastic elastomer.

32. A thermally driven piston assembly as in claim 15 wherein said foam is a polymer foam.

33. A thermally driven piston assembly as in claim 32 wherein said polymer foam is selected from the group consisting of closed cell, microcellular, and open cell.

34. A thermally driven piston assembly as in claim 15 wherein said polymer is selected from the group consisting crosslinked polymer and polyurethane.

35. A thermally driven piston assembly as in claim 34 wherein said crosslinked polymer is selected from the group consisting of polystyrene, polyvinyl chloride, polyamino acid, protein, polyethylene, polycarbonate, polyester, nylon, phenolic, polymethacrylimide, and polyethersulphone.

36. A thermally driven piston assembly as in claim 15 wherein said composite matrix is selected from the group consisting of polyimide, liquid crystal polymer, epoxy, polyamide, polyaramide, polyether, and polyarylether.

37. A thermally driven piston assembly as in claim 36 wherein said liquid crystal polymer is selected from the group consisting of liquid crystal polyester and liquid crystal polyaramide.

38. A thermally driven piston assembly as in claim 36 wherein said polyether is selected from the group consisting of PEEK and PET.

39. A thermally driven piston assembly as in claim 36 wherein said polyarylether is selected from the group consisting of such as bisphenol and cyanate ester.

* * * * *